Aug. 29, 1944.  J. P. HURNDALL  2,357,003
APPARATUS FOR MEASURING THE VISCOSITY AND DENSITY OF A LIQUID
Filed Aug. 22, 1940  2 Sheets-Sheet 1
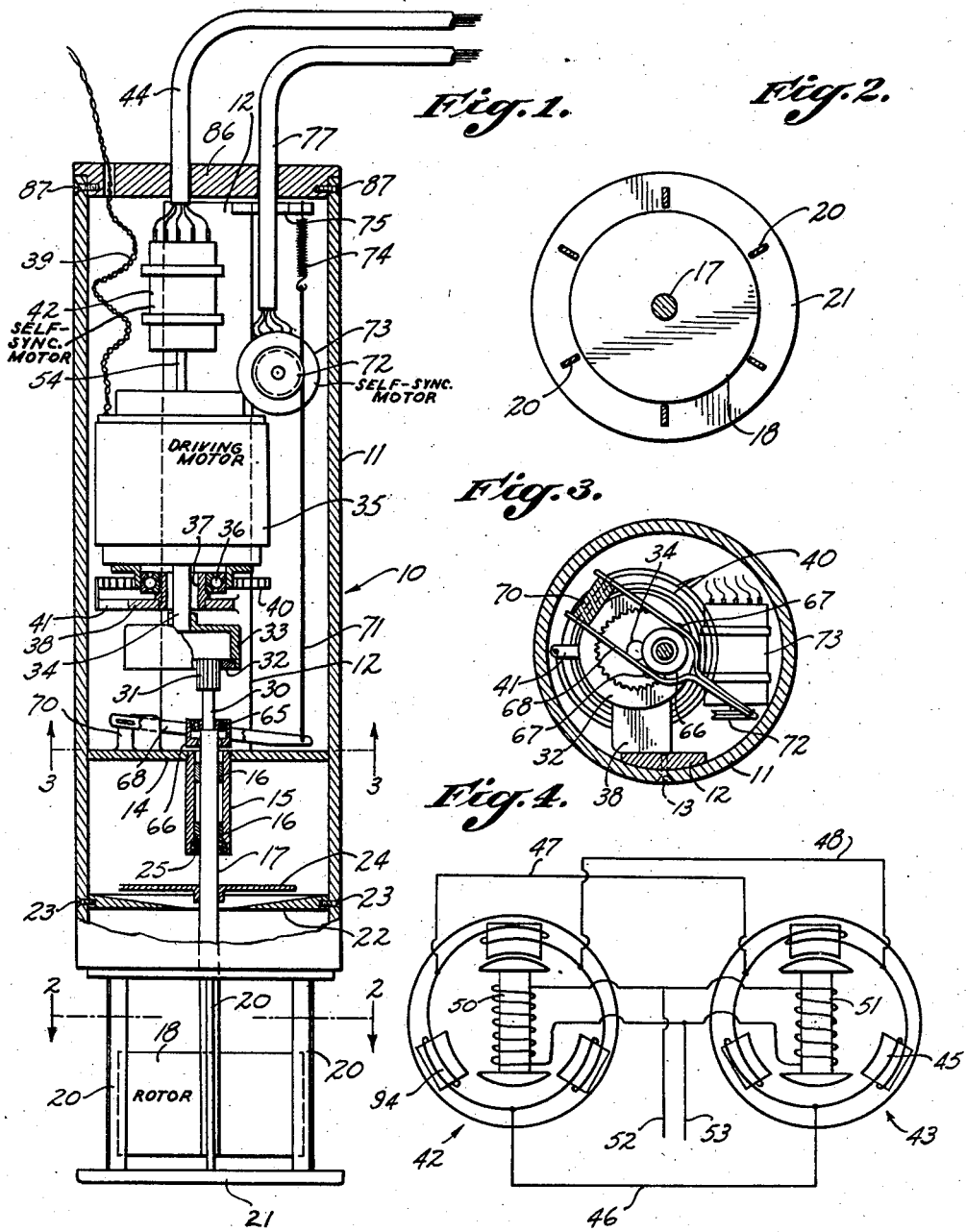
INVENTOR.
John P. Hurndall,
BY Russell M. Otis
ATTORNEY.

Aug. 29, 1944. J. P. HURNDALL 2,357,003
APPARATUS FOR MEASURING THE VISCOSITY AND DENSITY OF A LIQUID
Filed Aug. 22, 1940 2 Sheets-Sheet 2

INVENTOR.
John P. Hurndall,
BY Russell M. Otis
ATTORNEY.

Patented Aug. 29, 1944

2,357,003

UNITED STATES PATENT OFFICE 2,357,003

APPARATUS FOR MEASURING THE VISCOSITY AND DENSITY OF LIQUIDS

John P. Hurndall, Los Angeles, Calif., assignor to Petroleum Instrument Corporation, Los Angeles, Calif., a corporation of California Application August 22, 1940, Serial No. 353,718

7 Claims. (Cl. 265—11)

This invention relates to apparatus for measuring the viscosity and density of fluids and has a particularly valuable application in the measurement of the viscosity and the density of drilling mud which is used in the drilling of oil wells.

It is an object of this invention to provide a unitary apparatus for simultaneously measuring both the viscosity and the density of a fluid.

Another object is to provide an apparatus for measuring simultaneously the viscosity and the density of a fluid at the identically same place.

Another object is to provide an apparatus in which certain of the parts thereof perform two functions, in such a manner that a great amplification is effected in the simultaneous measurement of the viscosity and the density of the fluid.

Another object of the invention is to provide an apparatus for measuring the viscosity and the density of fluid, which permits indicating and recording of these quantities at a remote location.

Another object is to provide an apparatus which is efficient, convenient to use, and is of long life.

These and other apparent objects are attained in a manner which will be clear from consideration of the following description taken in connection with the accompanying drawings, of which:

Fig. 1 is an elevational view, partly in section, showing that part of the apparatus of my invention which is partially submerged in the fluid whose viscosity and density it is desired to measure.

Fig. 2 is a sectional view of the apparatus of Fig. 1 taken along the line 2—2, as indicated.

Fig. 3 is sectional view of the apparatus of Fig. 1 taken along the line 3—3, as indicated.

Fig. 4 is a diagrammatic illustration of the manner in which torque is preferably electrically transmitted in the apparatus of my invention.

Figure 5:
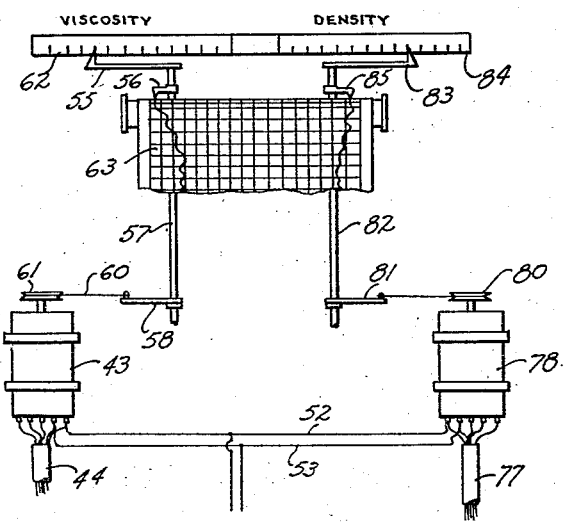
Fig. 5 illustrates the indicating and recording part of the apparatus of my invention.

In the apparatus of my invention I provide for the simultaneous measurement of both the viscosity and the density of a fluid. This is preferably accomplished by causing a body to be rotated in the fluid and by measuring both the torque required to rotate the body and the buoyant action of the fluid on the body. The apparatus is preferably comprised of two parts, one part which is preferably partially submerged in the fluid and the other part which constitutes the indicating and recording mechanism.

In the disclosed embodiment of the invention, the part 10 which is submerged in the fluid is illustrated in Figs. 1–3. A cylindrical housing 11 of the part 10 has therein a longitudinal supporting member 12 which may be secured to the housing by screws 13 and on which most of the elements comprising the part 10 are mounted, in such manner that the member 12 and its associated elements may be removed as a unit from the housing 11 for convenience in assembly and repair. At the bottom of the member 12 is mounted thereon a circular partition plate 14 which preferably fits tightly the interior surface of the housing 11. Screwed into the bottom side of the plate 14 so as to extend downwardly therefrom is a bearing housing 15 containing preferably oil-less sleeve bearings 16.

Extending downwardly through a hole in the partition plate 14 and through the bearings 16 is a shaft 17 which carries on its lower end a preferably solid metal cylindrical rotor 18. Surrounding the rotor 18 is a cage preferably comprising a plurality of vertical radially disposed, circumferentially spaced vanes 20 which are mounted on the bottom of the housing 11 in such manner that there is ample clearance between the vanes 20 and rotor 18. The vanes 20 are supported at their lower ends in a ring 21. The clearance of the vanes 20 over the rotor 18 is preferably permanent in each instrument but may be modified in various instruments to accommodate various ranges of fluids. Somewhat above the lower end of the housing 11 is located a baffle plate 22 which may be secured to the housing by means of screws 23. The baffle plate 22 has a hole through the middle to accommodate the shaft 17 and is preferably dish-shaped on top to provide clearance for a second baffle plate 24 which is mounted on the shaft 17 to rotate therewith directly above the baffle plate 22. The effect of these baffle plates is to prevent fluid from being splashed by the rotating rotor up into the housing. A seal 25 at the lower end of the bearing housing 15 bears lightly on the shaft 17 and prevents fluid from entering the bearings 16.

On the upper end of the continuation 30 of the shaft 17 is mounted an elongated gear 31 which is in toothed engagement with an internal gear 32 carried in a bell-shaped member 33 secured on the lower end of the shaft 34 of an electric driving motor 35. The interior of the bell-shaped member 33 is so dimensioned as to permit a relatively large vertical movement of the gear 31 while said gear is in mesh with the gear 32. The motor 35 is preferably a synchronous motor or one which provides substantially a constant speed of rotation.

The torque required to rotate the rotor 18 at a certain speed while submerged in a fluid is a measure of the viscosity of the fluid. In the apparatus of my invention, therefore, the torque exerted by the motor 35 is measured. In order to permit measurement of the motor torque, the frame of the driving motor 35 is rotatably mounted in a ball bearing 36 which is supported in a bearing mounting member 37 secured in a transverse bracket 38 attached to the main supporting member 12. The conductors 39, leading to a source of electrical power, connect with the motor 35 and are made sufficiently flexible and slack that they do not affect the turning of the frame of the motor 35. A spiral spring 40 is secured at its inner end to the frame of the motor 35 and at its outer end to an arm 41 attached to the bracket 38, the spring 40 tending to turn the motor frame in a clockwise direction as viewed from below in Fig. 1. The motor 35 is adapted to rotate the rotor 18 in a clockwise direction, as viewed from below in Fig. 1, thereby tending to cause the motor frame to rotate in a counterclockwise direction, as viewed from below in Fig. 1, all in such manner that the spring 40 resists the tendency of the motor frame to rotate when torque is applied in rotating the rotor 18. The angle through which the motor frame turns against the resistance of the spring 40 is a measure of the torque required to turn the rotor at the operating speed and is, therefore, a measure of the viscosity of the fluid in which the rotor 18 is turning.

The angle assumed by the frame of the motor 35 is preferably indicated at a remote location by means of self-synchronizing motors 42 and 43 which are connected by a multi-conductor cable 44. The motors 42 and 43 are preferably of the type known as "Selsyn" or "Autosyn" motors. Motors of this type, when suitably energized, have the property of being able to accurately communicate from one to the other the angular position of one of the motor armatures. As the armature of one of the motors is rotated, the armature of the other motor accurately follows the first, so that the angular position of the armature of the second motor may be used as an indication of the angular position of the armature of the first motor. The electrical connections between the motors 42 and 43 may be as diagrammatically illustrated in Fig. 4. In this form, the motors 42 and 43 have three-phase stationary field windings 94 and 45, respectively, with conductors 46, 47, and 48 connecting corresponding points on the two windings. The rotors 50 and 51 of the motors 42 and 43, respectively, have single-phase windings which are connected in parallel and to a source of alternating current through the conductors 52 and 53. The conductors 46, 47, and 48 and the conductors connecting the rotors of the motors 42 and 43 are preferably contained in the cable 44.

The rotor 50 of the motor 42 is connected to a shaft 54 which is connected for rotation with the frame of the motor 35. Hence, as the motor 35 exerts torque and its frame is displaced angularly against the action of the spring 40, the rotor 50 is also angularly displaced. This results in a corresponding angular displacement of the rotor 51 of the motor 43 whose angular position may then be taken as a measure of the viscosity of the fluid in which the rotor 18 is rotating.

Ordinarily the motor 43 is located at a point remote from the instrument 10 and is connected in the manner shown in Fig. 5 to both visually indicate and record the viscosity continuously. This may be accomplished by mounting an indicating hand 55 and a recording pen or stylus 56 on a shaft 57 to rotate therewith. The shaft 57 also carries an arm 58 to which is connected a cord 60 which is wrapped around and fastened to a pulley 61 on the shaft of the motor 43 in such manner that as the rotor 51 of the motor 43 turns the hand 55 is moved across the visual viscosity scale 62, and the recording pen 56 is moved across the underlying record paper 63 which is uniformly moved in the usual manner beneath the pen 56 by conventional mechanism, to produce a continuous record of the viscosity of the fluid in which the rotor 18 is rotating.

In measuring the density of the fluid in which the rotor 18 is submerged, I employ the buoyant effect of the fluid upon the rotor 18 which in the disclosed embodiment weighs more than the fluid which it displaces. The weight of a body immersed in a fluid is substantially equal to the weight of the body in air less the weight of the fluid displaced by the body. Thus, the weight of the rotor 18 when submerged in the fluid being tested is dependent upon the density of the fluid, and if the weight of the rotor 18 is measured under these circumstances it will serve as an inverse measure of the density of the fluid. The shaft 17 to which the rotor is attached is freely slideable in the sleeve bearings 16, and it will be apparent that because of the elongated gear 31 considerable vertical movement of the rotor 18 and its attached shaft 17 is possible while the gears 31 and 32 are still meshed. The friction between the shaft 17 and the bearings 16 and seal 25 and between the gear 31 and the internal gear 32, tending to restrain vertical movement of the shaft, is imperceptible when the shaft is turning.

This vertical position of the rotor 18 is measured by the means now to be described. A ball bearing 65 located at the lower end of the narrowed continuation 30 of the shaft 17 has its inner race press-fitted on the shaft and its outer race press-fitted in a housing 66. The housing 66 has pins 67 extending into holes in a yoke 68 which forms a lever fulcruming with an elongated hole and pin connection about a support 70 mounted on the plate 14. At the end of the lever 68 is attached a flexible filament 71, such as a cord or wire, which passes around a pulley 72 on the shaft of a motor 73 and is at its upper end secured to the end of a spring 74 the other end of which is preferably supported adjustably from a bracket 75 carried by the supporting member 12. It will be evident that the rotor 18 is supported vertically by the spring 74 acting through the cord 71 and the lever 68 and that if the weight of the rotor 18 is changed by immersion in a fluid or by a change in the density of that fluid, the rotor will alter its vertical position until its weight is in equilibrium with the force of the spring 74 and that this vertical movement of the cord 71 causes the pulley 72 and therefore the rotor of the motor 73 to rotate correspondingly. The vertical movement of the rotor 18 may take place while it is rotating and the long gear 31 then simply slides vertically relative to the internal gear 32 which is driving it.

The motor 73 is one of a pair of self-synchronizing motors similar to the motors 42 and 43, above-described. The cable 77 contains electrical conductors connecting the motor 73 with its companion motor 78 in the manner previously described, and the conductors 52 and 53 may serve to energize the motors 73 and 78 as well as the motors 42 and 43. Because of the self-synchronizing character of the motors 73 and 78, the rotor of the motor 78 follows accurately the rotor of the motor 73 in its angular displacement, and the angular position of the pulley 80 on the shaft of the motor 78 may be taken as an indication of the vertical position of the rotor 18 and, therefore, of the density of the fluid being tested. The pulley 80 is connected to a visual indicating and a recording means by having a cord wrapped around the pulley 80 and attached thereto and to an arm 81 which is secured for rotation with a shaft 82 carrying an indicating arm 83 movable across a visual density scale 84 and a recording pen 85 which records on the continuously moving record 63. Thus, a continuous record of the density of the fluid in which the rotor 18 is immersed is made along with a record of the viscosity of the fluid.

A cap 86 for the top of the instrument 10 is provided, having holes for passage therethrough of the cables 44 and 77 and the conductors 39, and may be fastened to the housing 11 by screws 87. If it is desired to completely submerge the instrument 10 in the fluid it is desirable to seal the entire top of the instrument with a suitable sealing compound to prevent the escape of air from the interior of the housing. The instrument 10 may be supported in the fluid by any suitable means.

In operation, the instrument 10 is lowered into the fluid to be tested and is preferably supported in a fixed position so that the fluid level is above the bottom of the housing 11, completely surrounding the rotor 18. The electrical circuits are energized and the motor 35 rotates the rotor 18 in the fluid. The frame of the motor 35 turns against the spring 40 through an angle depending upon the torque required to rotate the rotor 18. The rotor of the motor 42 is turned by the frame of the motor 35 and the rotor of the motor 43 automatically turns through a corresponding angle, moving the indicating arm 55 and the recording arm 56 to positions wherein they indicate and record on calibrated scales the viscosity of the fluid being tested. Coincidentally with this action, the buoyant effect of the fluid raises the rotor to a position depending upon the density of the fluid, causing the lever 68 to be raised and the rotor of the motor 72 to be turned through a proportional angle. The rotor of the motor 78 turns through a corresponding angle and moves the indicating arm 83 and the recording arm 85 to positions wherein they indicate and record on calibrated scales the density of the fluid being tested. It will be evident that as the viscosity and density of the fluid change, these changes will be reflected in the changed positions of the indicating and recording arms.

It is to be noted that the apparatus of my invention provides continuous simultaneous records and indications of both the viscosity and the density of the identically same sample of fluid. The rotation of the rotor, which is necessary in the measurement of viscosity, also contributes in an important manner to the measurement of the density, for the rotation of the rotor and its attached shaft not only causes the friction resisting vertical movement of the rotor to be reduced to a minimum, but also keeps the rotor clean by throwing off material which would otherwise adhere to the rotor and produce an inaccuracy in the measurement of density. Without the rotation of the rotor the measurement of fluid density by measuring the buoyant action of the fluid thereon would not be practical for thick unrefined fluids.

It will be understood that various changes and modifications in the disclosed apparatus of my invention may be made without departing from the spirit and scope of the invention as defined by the appended claims.

I claim as my invention:

1. In apparatus for measuring the viscosity and density of a liquid, the combination of: a vertically movable rotor adapted to be rotated in the liquid to be tested; means for rotating said rotor including a rotative connection causing said rotor to freely move in a vertical direction while rotating; a spring acting to support said rotor vertically when said rotor is in said liquid; and measuring means responsive to the vertical position of said rotor.

2. In apparatus for measuring the viscosity and density of a liquid, the combination of: a vertically movable rotor adapted to be rotated in the liquid to be tested, said rotor weighing more than the fluid displaced thereby; means for rotating said rotor including a rotative connection permitting said rotor to freely move in a vertical direction while rotating; a spring urging said rotor in an upward direction; and measuring means responsive to the vertical position of said rotor.

3. In apparatus for measuring the viscosity and density of a liquid, the combination of: a vertically movable rotor adapted to be rotated in the liquid to be tested; means for rotating said rotor including a rotative connection; a shaft attached to said rotor; a bearing in which said shaft rotates; a lever connected to said bearing; a pulley; a flexible filament connected to said lever and wound around said pulley; a spring connected to said flexible filament in such manner as to urge said rotor upwardly; and measuring means responsive to the angular position of said pulley.

4. In apparatus for measuring the viscosity and density of a liquid, the combination of: a vertically movable rotor adapted to be rotated in the liquid to be tested; a vertical shaft connected to said rotor; an electric driving motor; a gear connection between the rotating part of said motor and said shaft including an elongated gear permitting free vertical movement of said shaft while rotating; a spring acting to support said rotor vertically when said rotor is in said liquid; and measuring means responsive to the vertical position of said rotor.

5. In apparatus for measuring the viscosity and density of a liquid, the combination of: a slidably and rotatably mounted vertical shaft; a rotor on the lower end of said shaft; an electric driving motor having a frame, the frame of said motor being capable of a limited rotation; a gear connection between the shaft of said motor and said rotor shaft; a spring restraining rotation of said motor frame due to torque applied to said rotor shaft; and measuring means responsive to the angular position of said motor frame.

6. In apparatus for measuring the viscosity and density of a liquid, the combination of: a rotor adapted to be rotated in the liquid to be tested; a plurality of stationary vanes forming a cage surrounding said rotor; an electric driving motor having a frame, the frame of said motor being capable of a limited rotation; a rotative connection between the shaft of said motor and said rotor; a spring restraining rotation of said motor frame due to torque applied to said rotor; and measuring means responsive to the angular position of said motor frame.

7. In apparatus for measuring the viscosity and density of a liquid, the combination of: a slidably and rotatably mounted vertical shaft; a rotor on the lower end of said shaft; a plurality of stationary vanes forming a cage surrounding said rotor; an electric driving motor having a frame, the frame of said motor being capable of a limited rotation; a first gear driven by the shaft of said motor; a second gear on the upper end of said rotor shaft meshing with said first gear, said second gear having an elongated face in such manner as to permit vertical movement of said rotor shaft while rotating; a spring restraining rotation of said motor frame due to torque applied in rotating said rotor; measuring means responsive to the angular position of said motor frame; a lever connected for vertical movement with said rotor shaft; a pulley; a flexible filament connected to said lever and wound around said pulley; a spring connected to said flexible filament in such manner as to urge said rotor upwardly; and measuring means responsive to the angular position of said pulley.

JOHN P. HURNDALL.